340-870.15 SR

XR 3,815,119

United States Patent [19]

Finlay, Jr. et al

[11] 3,815,119

[45] June 4, 1974

[54] REMOTE METER READING SYSTEM USING ELECTRIC POWER LINES

[75] Inventors: Alexander Finlay, Jr.; Robert E. Dyer, both of Springfield; William D. Kessler, Rochester, all of Ill.

[73] Assignee: Sangamo Electric Company, Springfield, Ill.

[22] Filed: Mar. 1, 1972

[21] Appl. No.: 230,873

[52] U.S. Cl. ......... 340/310 R, 340/205, 340/207 P, 340/184

[51] Int. Cl. ........................ G08c 19/14, G08c 15/04

[58] Field of Search ............ 340/207 P, 205, 310 A, 340/310, 184, 310 R

[56] References Cited

UNITED STATES PATENTS

| | | | |
|---|---|---|---|
| 1,768,688 | 7/1930 | Hinton | 340/310 A |
| 3,204,245 | 8/1965 | Dykaar | 340/310 A |
| 3,359,551 | 12/1967 | Dennison | 340/310 A |
| 3,458,657 | 7/1969 | Lester | 340/310 A |
| 3,521,267 | 7/1970 | Lester | 340/310 A |
| 3,693,155 | 9/1972 | Crafton | 340/310 R |
| 3,702,460 | 11/1972 | Blose | 340/310 A |

*Primary Examiner*—Thomas B. Habecker
*Attorney, Agent, or Firm*—Johnson, Dienner, Emrich, Verbeck & Wagner

[57] ABSTRACT

A remote meter reading system in which transmitters provide data signals over electric power line conductors to indicate the measurements of each of a plurality of meters to associated receivers at a remote location. The meter transmitters are divided into groups, the transmitters of each group being operative to generate different frequency signals in a given frequency band assigned to such group. The transmitters of each group are further divided into subgroups, each subgroup of transmitters being connected to a correspondingly different pair of the power line conductors. A receiver unit is provided for each subgroup of transmitters, the receiver for a subgroup being tunable to the frequencies in the band assigned to the group, and being connected to the same pair of line conductors as the transmitters of its associated subgroup.

Each transmitter provides signals at a preassigned frequency as determined by the group and subgroup to which the transmitter is assigned, the signals being of a first and second phase to represent the meter measurement by logic 1 and logic O signals. The signal input to each receiver is sampled for phase and converted to digital signals which are stored in discrete storage circuits for each of the transmitters.

11 Claims, 4 Drawing Figures

REMOTE METER READING SYSTEM USING ELECTRIC POWER LINES

BACKGROUND OF THE INVENTION

1. Field of the Invention

The present invention relates to remote meter reading systems, and more particularly to remote meter reading systems in which signals representing meter reading data are transmitted from a plurality of transmitters over the power line conductors of a branch of an electrical distribution system to receivers connected to the same branch of the electrical distribution system.

2. Description of Prior Art

The distribution of electricity, gas and water to the ultimate consumer has for the most part been controlled by, and has been the responsibility of, the public utility companies. Such companies have over the years developed distribution systems which are generally considered to be most reliable and dependable, and which effect the distribution of the desired service to the ultimate consumer at a relatively reasonable cost.

The payment for such service has been generally based upon the amount of service which is used by the customer. For such purpose, highly reliable meters have been developed and manufactured by independent companies for purchase and installation by the utility company at the consumer's residence or place of business. In the case of electrical power, for example, the electricity is transmitted from a generating source over a distribution network to distribution transformers in the area of ultimate consumption, and further over a three conductor branch to the individual service mains which enter the consumer's place of residence or business.

Meters located at the entrance of the service main to the consumer's place of residence or business continually measure the amount of electricity used by such consumer and provide a cumulative record of such amounts for readout by the utilities at convenient time periods. It is a conventional practice, for example, for the utility meter readers to effect readout of the information on the meters at monthly intervals. Readings as thus made are normally posted in a book or on a card which is carried by the meter reader, and then returned to the central offices of the utility for transcription, computation, billing and mailing to the consumer.

The shortcomings of such mode of data acquisition are well known in the field. Inaccessible meters, as for example, when a consumer is not at home, result in call backs, misreadings and annoyance and inconvenience to the customer. Further, the system requires that a party other than the meter reader must translate the information from the meter man's book entry into computer capatible form and as a result several potential instances of error are ever present.

The industry therefore has turned in recent years to the development of automated systems in which a more reliable type of meter reading data acquisition is provided, and particularly to systems in which the data is acquired in a computer-compatible form, whereby the automated computer equipment which is normally available at the utility plants may be more efficiently utilized both in the data processing and consumer billing.

One such system which has been developed is set forth in the copending application to James N. Bruner, Ser. No. 53,745 which was filed July 10, 1970. The meter reading system there described includes a mobile unit which travels along a route laid out along the streets and roads of a community, and in its travel transmits interrogating signals to transponder equipment which is connected to the meters disposed along such route. The transponder equipment automatically generates and transmits signals which represent the reading on the meter along with an identification number which is assigned to the meter. Transmit means on the mobile unit radiate meter interrogate signals in the direction of the transponders as the mobile unit moves into the range and bearing of the transponder equipment located at the meter equipment.

In one novel arrangement, the transponder unit associated with each meter comprises an antenna having a transmit and receive section and a nonlinear impedance network (such as nonlinear diode) connected therebetween. As the mobile unit moves into the bearing and range of the transponder unit for one of the meters, the interrogate signals transmitted bp the mobile unit are received by the receive section of the transponder antenna (which is tuned to the frequency of the interrogate signals) and impressed across the associated diode to effect nonlinear changes in the impedance of the diode. Distortion of the received signals as applied to the diode effects the consequent generation of harmonics of the received interrogate signals.

Since the transmit section of the transponder antenna is tuned to the frequency of the one of the generated harmonics of the interrogate singals (i.e., the second harmonic in one embodiment), the antenna will be operative to radiate the second harmonic signals back to the mobile unit. As the harmonic signals thus generated are transmitted to the mobile unit, control circuitry in the meter equipment controls modulation of the retransmitted signals with meter data (i.e., the reading on the meter register at the time and the meter identity).

While such arrangement represents a signifcant advance in the art, it has been found that in certain areas the addition of the transponder units to existing installations requires the use of local contractors for the purpose of mounting the antennas and connecting the same to the individual transponders. In addition, in certain installations equipment at a single receiver location is preferably used to receive and store the data output of a plurality of transmitters to a single transponder at such location for readout by the mobile unit, and as a result a suitable communication path must be connected between the meters which are located at the various customer locations and the single receiver location. The installation of such communication path again requires the use of local contractors, and a resultant expense of relative significance. In addition, in a number of communities electric power lines and the like are buried beneath the ground for aesthetic reasons. Obviously the stringing of three-wire conductors in such areas between the house and a central receiver location will not be acceptable to such communities, and in existing installations of such type, the trenching and burying of the further conductor set is costly and disturbing to the property owner.

There is a need therefore for a system in which the information accumulated by a plurality of meters at each of a plurality of locations may be conveniently tranmitted to a common receiver location in a practical, low cost mode, and particularly an arrangement in which such data transmissions may be effected without the introduction of additional wiring between the meters and the point of data acquisition for readout purposes.

There is also a need for a system of such type in which data representing the information for a larger number of meters may be processed over a single data acquisition location so that the cost per unit of data acquisition may be significantly reduced.

There is further a need for a transmitter of relatively low cost which is operative in such type system which generates signals which represent the meter data, and effect the transmission thereof for storage in digital form in a discrete accumulator for ultimate readout and use with automatic billing equipment.

SUMMARY OF THE INVENTION

The present invention is directed to a remote meter reading system in which a transmitter is provided for each of a large number of meters, each of which transmitters provides signals which represent the meter reading on its associated meter for transmission over electric power line conductors to associated receivers at a remote location from the meters.

In such system, the meters are divided into groups, each of the groups having a discrete operating band of frequencies assigned thereto. Each tranmitter for a meter in a frequency band is operative to generate signals at a different assigned frequency in such frequency band.

The meters in each group are further divided into subgroups, the transmitters of each subgroup being connected to a predetermined, different pair of the three power line conductors which provide electrical service to the area.

In one embodiment, 96 meters were divided into two groups of 48, the 48 transmitters connected to the meters of the first group being operative at frequencies separated by 5KHz in the first band 80 KHz—155 KHz, and the transmitters connected to the meters of the second group being operative at frequencies separated by 10KHz in the second band of 165 KHz - 315 KHz.

The forty-eight meters in each group are further divided into subgroups of sixteen meters each, with the transmitters of the 16 meters in the first subgroup being connected to conductors $L_1$, $L_n$, the transmitters of the sixteen meters of the second group being connected to the second conductor pair $L_2$, $L_n$, and the sixteen transmitters of the third subgroup being connected to service conductors $L_1$, $L_2$.

At the receiver end, a plurality of groups of receivers are connected to the power line conductors, each group of receivers being tunable to receive signals in a different one of the bands, the different receivers in each group being connected to receive the signal output of a different subgroup of transmitters. In one embodiment each group included three receivers, each receiver of the first group being assigned to receive the frequencies of the first band, and each receiver of the second group being assigned to receive frequencies of the second band.

The receivers in each group are in turn each connected to a different pair of the line conductors to thereby receive the signals output by a correspondingly different one of the transmitter subgroups. By way of example, in the illustrated embodiment, the first receiver which is assigned to receive frequencies in the first band of frequencies 80 KHz - 155 KHz is connected to the line conductors $L_1$, $L_n$ and is seleccively tuned to receive the output signals provided by the 16 tramsmitters of the first subgroup in the first group. The other five receiers are connected in a related pattern.

The remote meter reading system further includes novel transmitter circuits each of which has an oscillator circuit for generating signals which indicate the count output of an associated meter. The oscillator for each transmitter is enabled to operate at one assigned frequency in the frequency band for its associated group. An associated encoder circuit, including an encoder switch, is operative between a first position (logic 1) and a second position (logic 0) to represent a predetermined measurement which is made by the associated meter. The encoder circuit in such operation effects enablement of the oscillator at different half cycles of the power on the particular pair of service conductors to which the transmitter is connected, to encoder circuit effecting the operation of the oscillator in one half cycle whenever a logic 1 signal is output from the encoder switch, and effecting the operation of the transmitter in the alternate half cycle whenever the output from the encoder switch is logic 0.

By way of brief example, the first transmitter of the sixteen transmitters in subgroup 1 of group 1 has an oscillator which operates at 80 KHz (which is one of the sixteen assigned frequencies in band 1), and has its input and output circuits connected to an assigned pair of conductors ($L_1$, $L_n$). The oscillator in the first transmitter is thus enabled in the first half cycle of the power on lines $L_1$, $L_n$ whenever a first signal (identified as a logic 1 signal) is output by the encoder switch, and in the second half cycle of the power on the lines $L_1$, $L_n$ whenever the encoder switch provides a second output signal (identified as a logic 0 signal).

The output circuit of the transmitter includes a series resonant circuit which permits connection of the variable transmitter outputs of relatively low power to the electric power line conductors which have 120 - 240 v. power thereon.

The receiver equipment connected to the electric power line conductors on the secondary side of the same distribution transformer includes a group of superheterodyne receivers for each frequency band, each receiver in a group being connected to the power line conductors to receive only the frequency output of one subgroup of sixteen transmitters, each receiver in a group being connected to a different pair of power line conductors.

Tuner means for each of the receivers effects selective tuning of the receiver circuit to each of the sixteen assigned frequencies in the assigned band, the selective tuning being effected at a one pulse per second rate whereby the entire band is sampled in the sixteen second period. At the same time that the receiver circuit is being successively tuned to the different output frequencies of the transponders of its associated subgroup, the receiver beat oscillator is likewise shifted to thereby continually maintain a 20 KHz signal output from the receiver.

A phase detector circuit connected to the output of the receiver is operative to separate the phase signals and extend the separated signals over discrete paths. Associated circuit means effect conversion of the discrete signals to digital signals (logic 1, logic 0 for storage purposes).

Multiplexer means, which are driven in synchronism with the tuning means for the receiver, gate the digital signals thus provided for each meter to a discrete storage means for such meter. Thus, during the period the receiver means is tuned to receive the signal output (80KHz) of the first transmitter in the first subgroup, the multiplexer means gates the output of the phase detector means to a first storage circuit which is assigned to store the count for the first meter. It will be apparent therefrom that sixteen storage circuits are required for each subgroup of 16 meters, and a total of 96 discrete storage circuits are required to accumulate the count for each of the meters in the disclosed system.

Signal processing circuits are operative as set forth in more detail in the above identified copending application, to generate words in a cyclic manner which include the identity and stored counts of each meter, and a mobile unit periodically travels in the vicinity to project interrogating signals which effect readout of the data words which are thus prepared by the signal processing circuit and storage thereof in the mobile unit.

These and other objects and features of the invention will be apparent with reference to the accompanying drawings.

GENERAL DESCRIPTION

A. System Description

Figure 1:
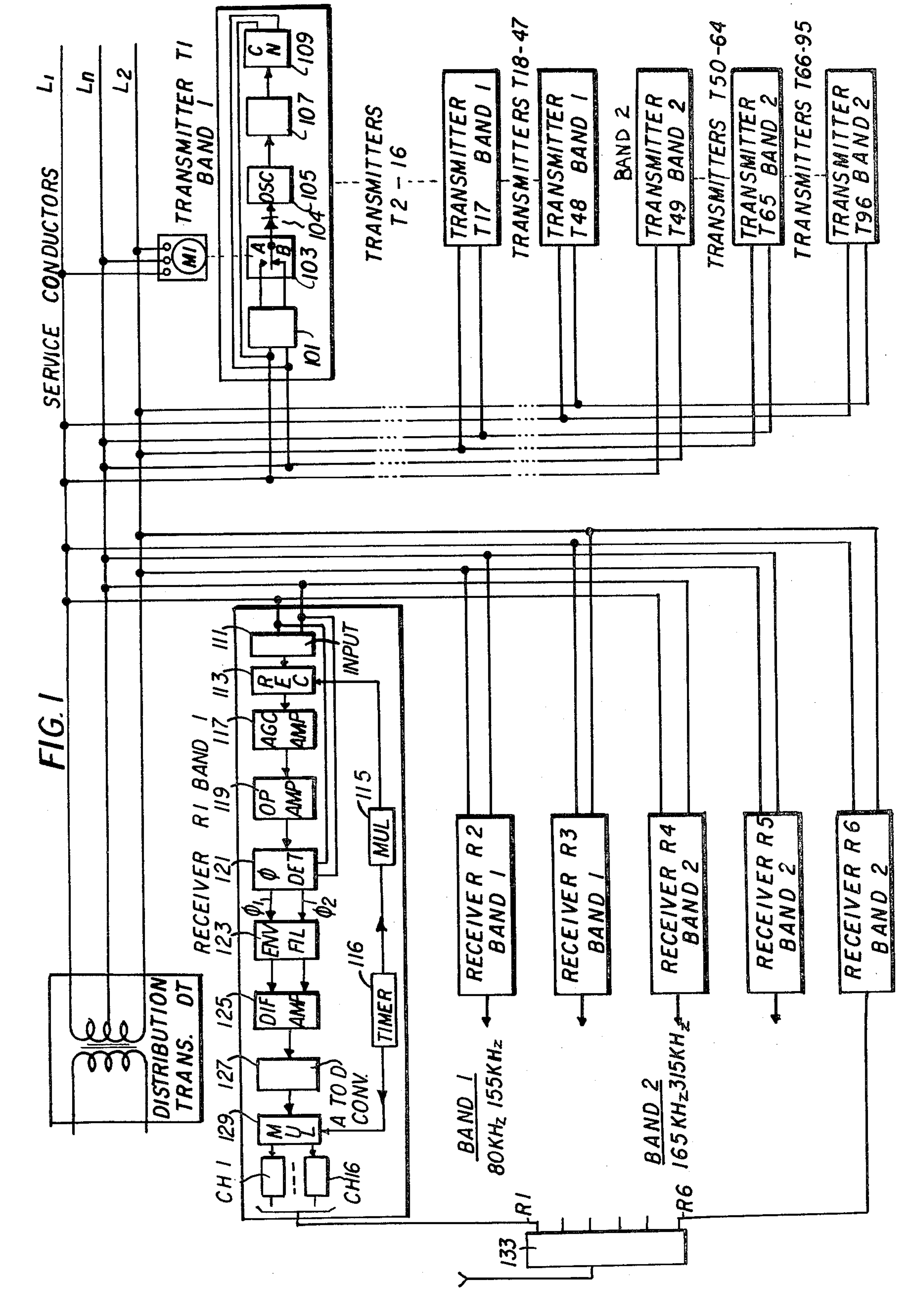
FIG. 1 is a block diagram of the novel system which uses electric power line conductors to connect the transmitters and receivers of a data acquisition system.

With reference to FIG. 1, there is shown thereat one subsystem of a plurality of subsystems in a novel automatic meter reading installation. Each such subsystem may comprise a plurality of transmitter units T1-T96 and a plurality of receiver units R1–R6 which are interconnected via the three service mains of a 240 volt, 60~ power supply which extend power from the secondary winding of a distribution transformer DT in an electrical distribution system to 96 different consumer points in such system. In accordance with conventional practice, each consumer location has a watthour meter, such as illustrated meter M1, for the first consumer, which measures and registers the amount of electrical power used by such consumer. One conventional meter well known in the field comprises an electric watthour meter of the type which is sold by the assignee as Model No. J4. As will be apparent, the novel system may be used with other types of meters and equipment including, but not limited to, gas and water meters.

In the novel system, each meter, such as M1, has a transmitter circuit, such as T1, connected to the service conductors $L_1L_nL_2$ and linked to the associated meter to detect measurement by such meter of a predetermined amount of power or commodity consumption.

As will be shown, the transmitters T1–T96 responsively generate signals for transmission over the service conductors $L_1L_nL_2$ which indicate each predetermined change in the measurements recorded by the associated meters M1–M96 to associated receiver equipment R1–R6 for storage and eventual readout for billing purposes.

As shown in FIG. 1, the transmitter circuits T1–T96 are divided into two groups, the first group including forty-eight transmitters T1–T48 which are operative to provide output signals which are in a first frequency band (Band 1 — 80–155 KHz), and the second group including 48 transmitters T49–T96 which are operative to provide output signals which are in a second frequency band (Band 2 — 165–315 KHz). Each of these groups of 48 transmitters is further divided into three subgroups of 16 transmitters each. Thus, group 1 comprised of transmitters T1–T48 is divided into three subgroups, the first subgroup including transmitters T1–T16, the second subgroup including transmitters T17–T32, and the third subgroup including transmitters T33–T48. Group 2 comprised of transmitters T49–T96 is likewise divided into three subgroups, the first of which subgroups includes transmitters T65–T86 and the third of which subgroups includes transmitters T87–T96.

Each subgroup of transmitters in a group, such as transmitters T1–T16 of Group 1, transmitters T17–T32, transmitters T33–T48 are operative to generate and transmit signals in a predetermined assigned band (80–155KHz), each transmitter in a subgroup being operative to generate signals which are displaced by 5 KHz from each other. Thus, transmitters T1, T17, T33 are operative to generate 80 KHz signals, transmitters T2, T18, T34 are operative to generate 85 KHz signals, etc. The sixteen transmitters of the three subgroups of transmitters in Group 2 are in turn each operative to transmit signals in a second band (165 KHz–315 KHz). The sixteen transmitters of each of the second three subgroups generates frequency signals in the second band which are displaced from each other by 10 KHz. Thus transmitters T49, T65, T81 generate signals at 165 KHz; transmitters T50, T66, T82 generate signals at 175 KHz, etc.

The signal inputs and outputs of the transmitter in each of the three subgroups 1,2,3 of Band 1 are connected in different combinations to the three-wire service conductors $L_1$, $L_2$, $L_n$. The input and output of transmitters T1–T16 of subgroup 1 in Group 1, for example, are shown connected to service conductors $L_1$, $L_n$; the input and output of transmitters T17–T32 of subgroup 2 in Group 1 are shown connected to service conductors $L_2$, $L_n$; and the input and output of transmitters T33–T48 of subgroup 3 in Group 1 are shown connected to conductors $L_1$, $L_2$.

In a similar manner, the transmitters of the three subgroups 1, 2 and 3 in Group 2 which transmit signals at frequencies which lie in Band 2 (165–315 KHz) have their inputs and outputs connected, respectively, to service conductors $L_1$, $L_n$; $L_2$, $L_n$; and $L_1$, $L_2$.

In the disclosed system associated receiver units R1–R6 which may be mounted in any convenient location along service conductors $L_1$, $L_n$, $L_2$ are connected in a predetermined pattern to receive the signals output of preassigned ones of the transmitters T1–T96. In most embodiments, the receivers R1–R6 would be conveniently mounted in the vicinity of the pole which supports the distribution transformer DT which supplies the power to the service conductors $L_1$, $L_n$, $L_2$. As will be shown the number of transmitters and receivers will vary with the number of consumers which are connected to the distribution transformer DT. By way of example, if 16 (or less) consumers are fed by the distribution transformer DT, only a single receiver R1 and a single group of transmitters T1 will be required. As the number of consumers tied to the output of a distribution transformer DT increases (as for example in an expanding community) additional receivers and subgroups of transmitters may be readily added as shown to accommodate such increase. Such arrangement obviously has unusual flexibility in the field which permits a more expeditious use and adaption of existing meter installations.

As shown in FIG. 1, the six receiver units R1–R6 are divided into two groups, the first three receivers R1–R3 being assigned to receive the signal output of the transmitters T1–T48 in Band 1 (80–155KHz) and a second group of receivers R4–R6 being assigned to receive the signal output of the second group of transmitters T49–T96 in Band 2 (165–315 KHz).

The receivers R1-R3 for the first frequency band have their inputs connected to the service conductors $L_1L_n$; $L_nL_2$; $L_1L_2$ respectively, so as to receive the output of only a preassigned one of the three subgroups of the transmitters in the first group. Thus receiver R1 which receives signals in the first band (80 KHz – 155 KHz) and has its input conductors connected to the service conductors $L_1$, $L_n$ will receive only the signal output of transmitters T1-T16 in subgroup 1. Receiver R2 which is also tuned to Band 1 and has its input conductors connected to the service conductors $L_n$, $L_2$ will only receive the signal output from the second subgroup of transmitters T17–T32 of subgroup 2 in Band 1, and receiver R3 which is tuned to Band 1 and has its input connected to service conductors $L_1$, $L_2$ will only receive the signals output from the transmitters T33–T48 of subgroup 3 in Band 1.

In like manner, receiver R4 which is tuned to receive the 165–315 KHz signals in Band 2 and is connected to service lines $L_1$, $L_n$, will receive only the signal output of transmitters T49-T64 in subgroup 1 of Group 2; receiver R5 which is tuned to receive the 165–315 KHz signals in Band 2 and is connected to lines $L_n$, $L_2$ will receive only the signal output of transmitters T65–T80 in subgroup 2 of Group 2, and receiver R6 which is tuned to receive the 165–315 KHz signals and is connected to lines $L_1$, $L_2$, will receive only the signal output of transmitters T81–T96 of subgroup 3 in Group 2.

The signals applied to the service conductors $L_1L_2L_n$ by the transmitters T1–T96, as will be shown, are coded to indicate a change in the count at its associated meter to its associated receiver. Each receiver in turn includes means for accumulating information transmitted by its associated transmitters for eventual readout. In one system, such readout is effected by a mobile unit which is assigned to travel in the vicinity of the receiver at periodic intervals. A system of such type is described in detail in the above identified copending application of James N. Bruner. It will become apparent, however, that the system may also be used with other types of readout equipment.

B. General Transmitter Description

One novel transmitter circuit which may be used with the above described system is set forth in block in FIG. 1. As there shown, each transmitter, such as T1, basically comprises an input circuit 101 which is connected to derive power from an assigned pair of the three service conductors ($L_1$, $L_n$ for transmitter T1 for example) and an encoder switch member 103 which is operative to provide an output signal each time a quantum of energy is measured by its associated meter M1 (1 KWH in one system disclosed in more detail hereinafter).

The output of switch member 103, which as will be shown comprises a signal of different phase for each such quantum, is fed to an oscillator 105 which is tuned to oscillate at an assigned frequency (transponder T1 in the illustrated pattern oscillates at 80 KHz) and is enabled by power derived via a transformer 101 which is connected to the assigned pair of service conductors $L_1$, $L_n$ for such transmitter. The output of oscillator circuit 105 is of a first phase (as compared to the phase of the power on its associated pair of service conductors $L_1$, $L_n$) to indicate a first signal output (logic 1) by encoder switch 103, and a second phase to indicate a second signal output (logic 0) by switch 103. The 80 KHz phase oriented signals output from oscillator circuit 105 are fed over amplifier 107 and a series resonant coupling network 109 to service conductors $L_1$, $L_n$. Briefly stated, 80 KHz signals are applied to conductors $L_1$, $L_n$ during one half cycle of the 60~ power, whenever the movable contact of encoder switch 103 engages contact A, and during the alternate half cycle of the 60~ power whenever the movable contact of switch 103 engages contact B.

As will be shown, a shift in the movable contact of encoder switch 103 for a transmitter, such as T1, results in a corresponding shift in the 80 KHz modulation of the 60 cycle power on the conductors $L_1$, $L_n$. As the associated receiver (R1 for transmitter T1) detects such shift, one count is added to the accumulated count for such transmitter T1. Each of the other transmitters T2–T96 are operative in a similar manner to continually provide signals over the assigned ones of the service conductors $L_1$, $L_n$, $L_2$ at the assigned frequencies to associated ones of the receiver units R1-R6 to effect the desired change in the accumulated count for the associated meters.

C. General Receiver Description

As shown in block in FIG. 1, each receiver, such as illustrated receiver R1, comprises an input coupling circuit 111 which is connected to a preassigned pair of the service conductors ($L_1$, $L_n$ for receiver 1) to thereby detect the phase modulated signals output by an associated subgroup of transmitters (transmitters T1-T16 for receiver R1) over such pair of service conductors.

Receiver R1 as shown includes superheterodyne receiver 113 which may be tuned to the different frequencies of Band 1 (80–155 KHz), whereby signals outside Band 1 which are applied to the service conductors $L_1$, $L_n$ are rejected. A multiplexer circuit 115 is cyclically driven by a timing circuit 116 at a one pulse per second rate to effect tuning of receiver 113 successively to each of the sixteen assigned frequencies in Band 1 (80 KHz, 85 KHz, 90 KHz . . . 155 KHz). While receiver R1 is shown as having a discrete timer 116 and multiplexer 115, it will be apparent that the timer 116 and multiplexer may, in certain installations, be used to synchronously effect tuning of receivers R1–R3 to the sixteen frequencies of Band 1, and the receiver R4–R6 to the sixteen frequencies of Band 2.

With reference once more to receiver R1, and assuming that multiplexer 115 first effects tuning of receiver R1 to 80 KHz, the signal output of transmitter T1 as applied to conductors $L_1$, $L_n$ will be input to receiver 113 for a one second interval. Since the 60 cycle current on the power line is used as a reference, approximately 60 modulated pulses will be input to receiver 113 during such period.

Receiver 113 is a superheterodyne receiver which provides a different frequency beat signal for each of the different input signals, in each case the resultant difference or IF frequency being 20 KHz. Thus when the receiver 113 is tuned to 80 KHz the receiver 113 provides a 100 KHz beat signal, and the output of receiver 113 is a phase modulated 20 KHz signal. Such signal is fed over AGC amplifier 117 and operational amplifier 192 to a phase detector circuit 121, which separates the 01, 02 signals by referencing the detected signals to the input power signal on conductors $L_1$, $L_n$.

An envelope filter 123 connected to the 01, 02 output paths of phase detector 123 is operative to provide DC signals to the two inputs of a differential amplifier 125 to obtain a signal output having polarities which represent 01, 02 signals respectively. As will be shown, when a 01 signal is detected, differential amplifier 125 provides a positive signal output, and when a 02 signal is detected, differential amplifier 125 provides a negative signal output. Such signals are converted to digital signals, and a multiplexer circuit 129, which is cyclically driven in synchronism with multiplexer circuit 115 by timer circuit 116, successively connects the converted output of differential amplifier 125 successively over the sixteen different channels CH1–CH16 to discrete storage means for each transmitter in accumulator and processor circuit 133.

It will be apparent that during the same one second period that multiplexer 115 enables tuning of receiver 113 to 80 KHz to receive the output of transmitter T1, the multiplexer 127 connects the signal output of differential amplifier 125 to a discrete channel (channel CH1 for the signals of transmitter 1).

In the next fifteen seconds, receiver R1 is enabled to select the signal output from the transmitters T2, T3, etc., for successive one second intervals, and the multiplexer 127 extends the signal output of differential amplifier 125 over correspondingly different channels CH2–CH15.

As will be shown, each channel, such as channel CH1, has three signal conductors (logic 1, logic 0, ground) which in effect duplicates the signal output which occurs at its associated adjustable encoder switch, such as 103, which provides the signal input to its associated transmitter, such as T1, at meter M1. Stated in another manner, the signals provided by the encoder switch 103 at meter M1 in response to the measurement of each quantum commodity being consumer (1 KW, in one embodiment of the electrical utility meter) are reproduced and stored in the associated accumulator at receiver R1.

The signal output on each channel, such as channel CH1 is fed to a discrete accumulator in accumulator and processing circuit 133. Accumulator and processing circuit 133 may be of various types, one form of which is disclosed in the above identified copending application to James N. Bruner. In such arrangement signal processor equipment is operated continually to generate twenty-nine bit words, each of which words represent the accumulated count for a meter which is stored in a corresponding one of the accumulators, along with an identification code for such meter. The words as generated are continuously applied to a novel transponder arrangement, and as set forth in detail in such copending application, a mobile unit which travels along an assigned route at periodic intervals radiates meter interrogation signals in the direction of such transponder. A nonlinear impedance network (which has its impedance changed by the data words which are being continually applied thereto by the processor equipment 133), modulates the interrogation frequency signals which are input from the mobile unit, and reradiates the same, as modulated with the accumulated data words, back to the mobile unit for detection and recording thereat.

D. Specific Transmitter Description

Figure 2:
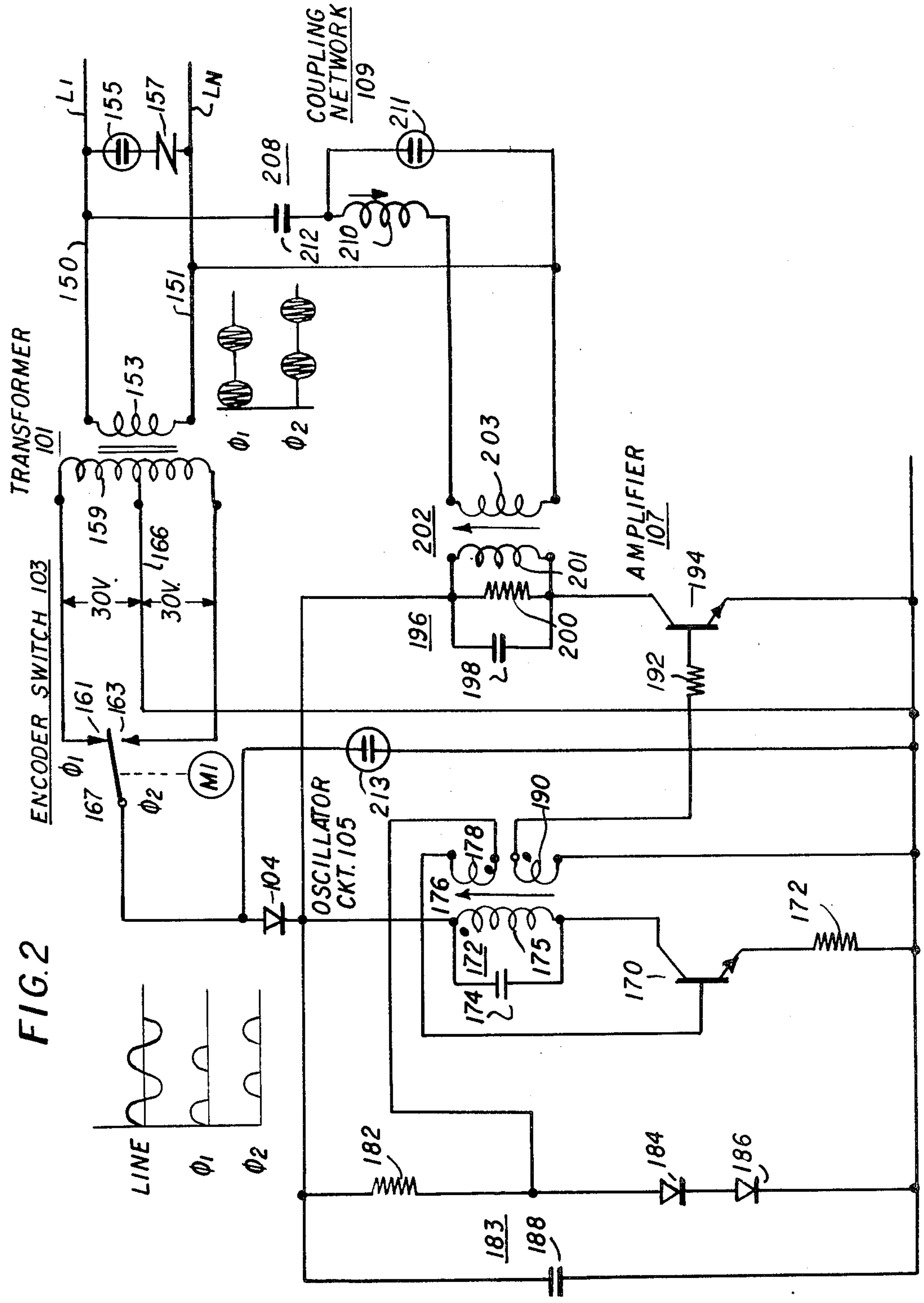
FIG. 2 is a circuit schematic of one novel transmitter which may be used in the system of FIG. 1.

With reference to FIG. 2, there is shown thereat one embodiment of a novel transmitter circuit which may be utilized in the system of FIG. 1 to generate and transmit meter information over an assigned pair of power line conductors to associated receiver equipment. As there shown the transmitter which is assumed to be transmitter T1 includes a transformer 101, an encoder switch 103, a tuned oscillator circuit 105, an amplifier 107, and a coupling network 109.

As noted above, the transmitters T1-T96 are divided into groups and subgroups and the connection thereof to service conductors $L_1$, $L_n$, $L_2$ is determined by the group and subgroup to which it is assigned. Transmitter T1, as shown in FIG. 2, has a pair of input conductors 150, 151 which are connected to power distribution conductors $L_1$, $L_n$ to provide 110 volt, 60 cycle to the primary winding 153 of transformer 101. A gas discharge tube 155 and varactor 157 (which may be be of the type commercially available as S8-C350 and Z1–V3 respectively) are connected across the primary winding of transformer 101 for lightning surge protection purposes.

Primary winding 153 of transformer 101 in one embodiment comprises 7600 turns of No. 44 wire. Secondary winding 159 of transformer 101 in such embodiment comprises 1900 turns of No. 37 wire which is centertapped as shown at 160. The output of transformer secondary winding 159 comprises a 30 volt peak signal as measured between the center tap 160 and each terminal end of secondary winding 159. The one terminal end of secondary winding 159 is connected to fixed contact 161 and the second terminal end of fixed contact 163 is connected to fixed contact 163. Movable arm 167 on encoder switch 103 is moved between contacts 161, 163 as the meter M1 measures successive quantums of electricity. The encoder switch 103, in effect, comprises a single-pole, double throw switch which is connected to transformer secondary winding 159 to provide a signal of different phase over the movable arm 167 with each change of position thereof in response to the measurement of each quantum of a commodity measured by associated meter M1, the center tap 160 providing a ground reference for the signals, and the phase of the power of source conductor $L_1$, $L_n$ providing a phase reference for the signals output over the movable arm 167 as the arm engages contacts 161, 163 respectively. Stated in another manner, with the arm 167 moved into contact with the upper terminal 167, the signal output from secondary winding 159 (as referred to center tap 160) is of a first phase, and with arm 167 in contact with the lower terminal 163, the signal output from secondary winding 159 (as referenced to center tap 160) is displaced 180° from the first phase.

In one embodiment, a movement of arm 167 was effected to provide a phase reversal for each measurement of 1 kilowatt hour by the electric watthour meter. Various types of encoder switches 103 may be provided to effect such phase reversal. Reference is made for example to one form of switch which is shown in U.S. patent application having Ser. No. 157,484, which was filed by Donald A. Eggleston and Trevor N. Samuel on June 28, 1971, and connected as shown in FIG. 2 hereat.

The phase-oriented signal output provided by movable arm 167 is connected over rectifier 104 to tuned oscillator circuit 105. In that rectifier 104 conducts only during each positive half cycle of the power on conductors $L_1$, $L_n$, the output of rectifier 104 with the arm 167 in contact with the upper contact 161 will be as shown by the waveform 01, and during the period that the movable arm 167 is in contact with the lower contact 163, the 02 signal output from rectifier 104 is displaced 180° from the phase 01 signals as shown by the 02 waveform. Thus, positive potential signals of two different phases are fed to tuned oscillator circuit 105 by the encoding switch 103, the phase of the applied signal indicating the position of movable arm 167.

Tuned oscillator circuit 105 for transponder T1 basically comprises a transistor 107 and a tank circuit 172 which is tuned to effect oscillation of transistor 170 at 80 KHz. (The oscillators of transmitters T2–T96 will of course be tuned to the frequencies indicated in the pattern of the system shown in FIG. 1). With reference once more to FIG. 2, transistor 170 includes an emitter connected over resistor 172 to reference ground (the center tap 160 of transformer secondary winding 159) and a collector element connected over a tank circuit 172 (which includes a parallel-connected tuning capacitor 174 and primary winding 175 on inductance 176) to the output of rectifier 104.

A first secondary winding 178 on inductance 176 is connected in a feedback mode to the base of transistor 170, a voltage divider 183 comprised of resistor 182 and diodes 184, 186 being connected to one side of inductance 176 to provide a slightly positive bias voltage over the feedback circuit (approximately one volt in the present embodiment) to bias transistor 170 in the slightly on condition. A decoupling capacitor 188 is connected across voltage divider 183.

A further secondary winding 190 on inductance 176 supplies the 80 KHz phase oriented signals output from the slug-tuned oscillator 105 over a current limiting resistor 192 to the base element of transistor 194 which is connected as a Class C amplifier in amplifier circuit 107. The emitter of transistor 194 is connected to reference ground, and the collector element is connected over a tank circuit 196 to the output of rectifier 104. Tank circuit 196 includes a parallel-connected capacitor 198, resistor 200 and inductance 201 which is the primary winding of an adjustable inductance 202 and is tuned to resonate at the same frequency (80KHz) as the oscillator tank circuit 172. The windings of inductance 202 are selected so that the tank circuit 196 is broadly tuned, whereby possible frequency drift of the oscillator circuit 105 will not seriously affect the power output of the transmitter T1. Inductance 202 may have an adjustable slug to assist in tuning of the tank circuit 196.

Secondary winding 203 of adjustable inductance 202 is series-connected across the service lines $L_1$, $L_n$ with a series resonant circuit 208 which includes inductance 210 and capacitor 212. The coupling network 109 including series resonant circuit 208 is important to the invention in that such circuit makes it possible to effect unilateral transmission of the relatively low power output signals of transmitter T1 over the service conductor lines (i.e., the 120 volt power on service lines $L_1$, $L_n$ must be isolated from the 1 volt, 80 KHz output of the transmitter T1).

Surge protection for the output circuit of transmitter T1 including inductance 203 and series resonant circuit 208 is provided by a neon bulb 211 (commercially available as NE-2 and rated at 65 volt breakdown). A second neon bulb 213 (NE-2) is connected across between the cathode of rectifier 104 and the center tap 160 of the secondary winding 159 of transformer 101.

The values of the components in one embodiment of a transmitter operative at 80 KHz are set forth hereat.

| | |
|---|---|
| Transformer **101** | |
| Primary Winding **153** | 7600 turns, No. 44 wire |
| Secondary Winding **159** | 1900 turns, No. 37 wire |
| Diode **104** | 1N4383 |
| Transistor **170** | 2N5830 |
| Resistor **172** | 100 ohms |
| Inductance **176** | 384 MH (Nominal) |
| Primary Winding **172** | 91 turns, No. 10-42 Litz |
| Secondary Winding **178** | 2½ turns, No. 10-42 Litz |
| Secondary Winding **190** | 5 turns, No. 10-42 Litz |
| Capacitor **174** | 0.0104 MFD (For 80 KHz) |
| Diodes **184, 186** | DA 111 |
| Resistor **182** | 3300 ohms |
| Capacitor **188** | 0.47 MFD |
| Resistor **192** | 180 ohms |
| Transistor **194** | MPS-U06 |
| Inductance **202** | 181 MH (Nominal) |
| Primary Winding **201** | 62 turns, No. 15-42 Litz |
| Secondary Winding **203** | 3 turns, No. 15-42 Litz |
| Capacitor **198** | 0.02 MFD (For 80 KHz) |
| Resistor **200** | 560 ohms |
| Inductance **210** | 39 Microhenries<br>29 turns No. 10-38 Litz |
| Capacitor **212** | 0.1 MFD |

E. Transmitter Operation

The 60~power output over the centertapped winding 159 on transformer 101 as fed over encoder switch 103 and rectified by rectifier 104 enables oscillator circuit 105 to oscillate at 80 KHz, the oscillator circuit 105 being so operative during one half cycle of the power on service conductors $L_1$, $L_n$ whenever movable arm 167 of encoder switch 103 is in the upper position in the other half cycle of the power on service conducturs $L_1$, $L_n$ (02) whenever movable arm 167 of encoder switch 103 is in the lower position.

The signal output of tuned oscillator circuit 105 is amplified by transistor 107 and is fed over tank circuit 196 which is also tuned to resonate at 80 KHz. The output of tank circuit 196 (which is in the order of 1 volt 80 KHz signal) is in turn fed over series resonant circuit 208 to the service line conductors $L_1$, $L_n$. The signals fed to service conductors $L_1$, $L_n$ for the different positions of encoder switch 103 are shown adjacent the coupling network 109 in FIG. 2.

The output signals of transmitters T2–T96 are continually applied in like manner to the assigned ones of power conductors $L_1$, $L_n$, $L_2$ whereby the changing count at meters M1–M96 represented by such signals on conductors $L_1$, $L_n$, $L_2$ is continually available at the receiver end of the system. Briefly reviewed, the 16 frequency signals of Band 1 are used by transmitters T1–T16 to transmit count information for meters M1–M16 over service conductors $L_1$, $L_n$, the sixteen frequency signals of Band 1 are used by transmitters T17–T37 to transmit the count output of the 16 meters M17–M37 over conductors $L_2$, $L_n$ and the same 16 frequency signals in Band 1 are used by transmitters T33–T48 to provide the count output for meters M33–M48 over conductors $L_1$, $L_2$. In a similar manner, the signal output of transmitters T49–T64 at the 16 frequencies in Band 2 are applied over conductors $L_1$, $L_n$ for meters M49–M64, the output of transmitters T65–T80 at the 16 frequencies in Band 2 are continually coupled to lines $L_2$, $L_n$ to represent the change in count of meters M65–M80, and the output of transmitters T81–T96 operating at the sixteen frequencies in Band 2 are continually applied to service lines $L_1$, $L_2$ to represent the count changes at meters M81–M96.

F. Detailed Receiver Description

Figure 3:
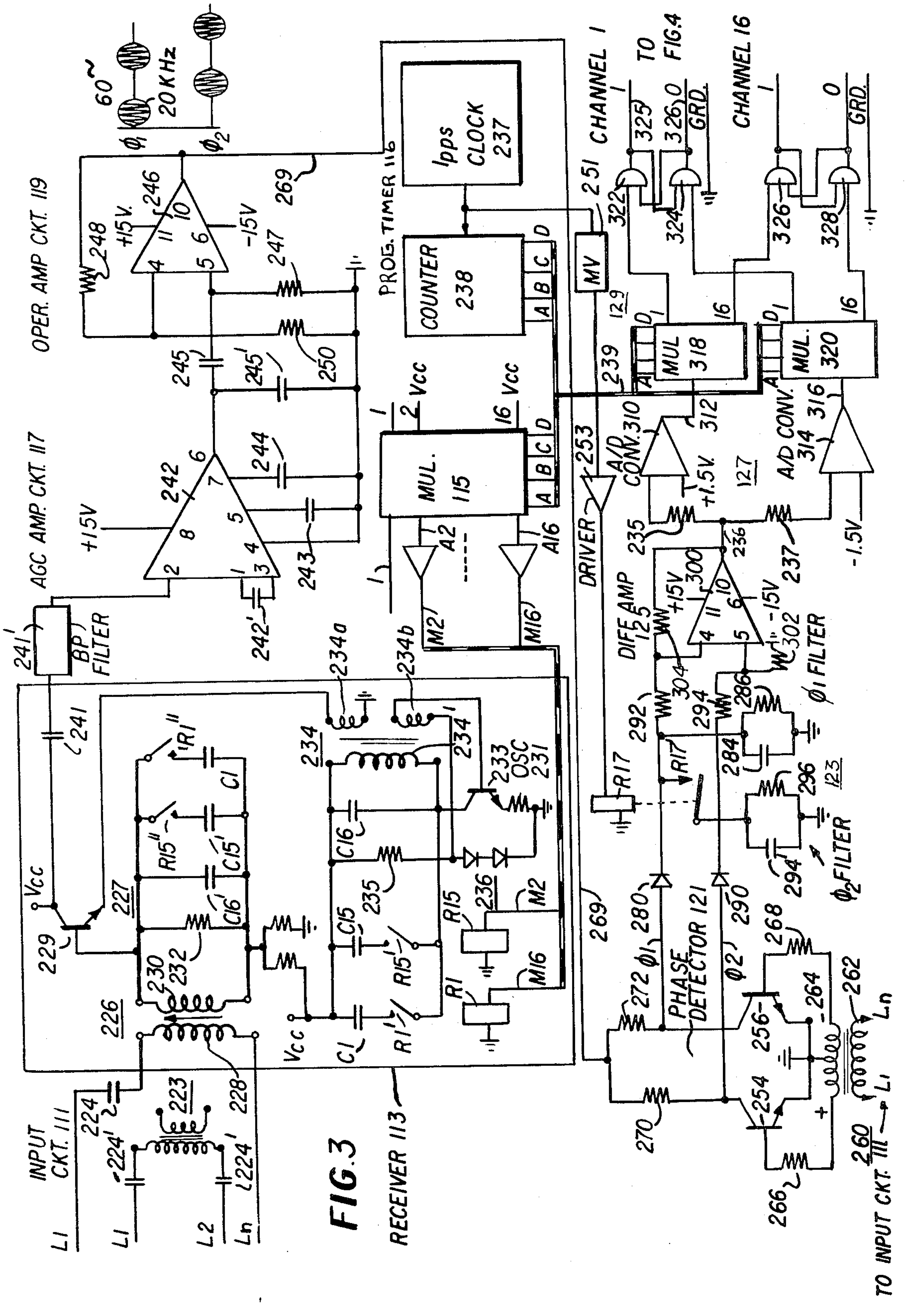
FIG. 3 is a schematic circuit of a novel receiver arrangement which may be used in the system shown in FIG. 1.

One embodiment of a receiver circuit, such as R1, which is adapted to be used with the transmitters, such as T1–T16 in the system pattern of FIG. 1 is shown in detail in FIG. 3. It will be initially recalled that receiver R1 is shown connected to service conductors $L_1$, $L_n$ and is adapted to be selectively tuned to the frequencies in Band 1 (80–155 KHz) to thereby receive the signals output by transmitters T1–T16 of subgroup 1 in Group 1. Input circuit 111 in receiver R1 as shown in FIG. 3 includes capacitor 224 and inductance winding 228 of inductance 226 connected in series with conductor $L_1$, $L_n$. (Receivers R3, R6 which are connected to the power conductors $L_1$, $L_2$ have an additional capacitance 224' connected in the input circuit as shown in FIG. 3).

Inductance 226 may have a secondary winding 230 which is connected in the tuning circuit 227 for receiver 113. Tuning circuit 227 further includes resistor 232 and capacitor C16' which as connected across the inductance 230 are of values selected to provide a tuned circuit which is resonant at 155 KHz. Further capacitors C15–C1 are arranged to be connected in parallel with capacitor C16 by relay contacts R15'' – R1'', each successive capacitor as connected effectively decreasing the frequency of tuned circuit 227 by 5KHz (155KHz, 150KHz, 145KHz, etc).

The signal output of the tuned circuit 227 is fed to the base element of transistor 229 which has its emitter connected to the beat frequency output of receiver oscillator 231 in the superheterodyne receiver 113. Oscillator 231 as schematically shown includes a transistor 233 having a tuned circuit 234 which basically includes parallel-connected capacitor C1 and inductance 234' connected in the collector circuit thereof. A secondary winding 234 associated with inductance 234' connects the output of tuning circuit 234 to the emitter circuit of transistor 229. A second winding **234*b* provides a feedback path to the base of transistor 233 which includes a positive bias signal derived by resistor 235 and diodes 236.**

The values of resistor 235, capacitor C1 and inductance 234' in tuned circuit 234 are selected to provide oscillation of oscillator 231 at 175 KHz. Capacitors C2–C16 are arranged to be connected in parallel with capacitor C1 by relay contacts R15' – R1' at successive time intervals to thereby adjust the tuner circuit 234 by 5 KHz increments over the frequency range of 175 KHz to 100 KHz. Receivers R2–R6 are similarly constructed, it being apparent that the value of capacitors C1–C16 and C1'–C16' for receiver R4–R6 would be selected to provide adjustment of the tuner circuits in 10 KHz increments over the frequency ranges 315–165 and 335–185 KHz respectively.

Reed relays R2–R16 have relay contacts R2'–R16' and R2''–R16'' respectively associated therewith, and are successively operated at one pulse per second rate by multiplexer 115 and program timer 116.

As shown in FIG. 3, program timer 116 includes a one pulse per second clock 237 which drives a 16 bit binary counter 238 (which may be of the type commercially available as SN7493) to provide a sixteen bit binary count output over the four conductors A,B,C,D. The output on conductor A, B, C, D, is fed over cable 239 to the steering input for multiplexer circuit 115 which has battery potential connected to its input leads 1–16, and which has its output leads 2–16 connected over amplifiers A2–A16 to reed relays R15–R1.

Since the counter 238 is driven at the one pulse per second rate, the count on conductor A,B,C,D, will change once each second, and multiplexer 115 will be enabled to connect a successive one of its inputs 1–16 to outputs 1–16 in known manner as each successive count is input thereto over conductors A–D in cable 239. At count 1 there will be no output from multiplexer 115 and accordingly the timer circuit 227 in receiver 113 will be tuned to 155 KHz and the beat oscillator 231 will be tuned to 175 KHz to provide a 20 KHz output over capacitor 241 and over 20 KHz band pass filter 241. As a one second interval expires, clock 237 advances counter 238 one count, and multiplexer 115 connects the battery VCC on input 2 to output 2 and over amplifier A2 to reed relay R15 which operates to close its contacts R15', R15'' and thereby connect capacitors C15, C15' in tuned circuits 234 and 227 respectively to thereby tune such circuits to 170 KHz and 150 KHz respectively. With 170 KHz signal input to the emitter of transistor 229 and 150 KHz signal input to the base of transistor 229, the output of transistor 229 over capacitor 241 is a 20 KHz signal.

It is apparent that as the clock 237 advances counter 238 through 16 counts in 16 seconds, the relays R15–R1 are successively operated to tune the tuner to the sixteen frequencies in Band 1 as predetermined by the values of capacitors C1–C16 and C1'–C16'. The output of receiver R1 in each case is a 20 KHz signal which is phase oriented as will be shown.

The manner in which receivers R4–R6 are similarly operative to provide 20 KHz signals will be apparent from such description. It is noted that the same timer 116 and multiplexer 115 may be used for the relays R15–R1 in the receivers R1–R6, the use thereof being limited only by the number of contacts which can be operated by each of the relays R15–R1.

The 20 KHz signal output of receiver 113 is fed over capacitor 241 and bandpass filter 241' to an AGC amplifier circuit 117 which includes an amplifier 242 which may comprise an integrated circuit available from Fairchild as LM372. Terminals 1, 3 of amplifier 242 are capacitively coupled by capacitor 242′, terminal 4 is connected to ground, terminals 5 and 7 are capacitively connected to ground over capacitors 243, 247 respectively, terminal 8 is connected to +15 volts, an output terminal 6 is connected over capacitor 245′ to ground and over capacitor 245 to one input of operational amplifier 246. Such input is also connected over resistance 247 to ground.

Operational amplifier 246 may be of the type commercially available from Texas Instruments as SN72741. Terminal 11 of amplifier 246 is connected to +15 volts and terminal 6 is connected to −15 volts. Output terminal 10 is connected over a feedback path including resistor 248 to input 4 which is also connected over resistance 250 to ground.

The AGC amplifier circuit 117 is operative to adjust the signal output which is input from receiver 113 to a relatively constant level, and operational amplifier circuit 119 increases the value of such signal output by a gain of 6. The representative signal output from operational amplifier circuit 119 to represent logic 1 and logic 0 signals input by encoder switch 103 and transponder T1 are respectively shown in FIG. 3 adjacent the output from amplifier 246.

The amplified output of operational amplifier 246 is fed over conductor 269 to the input of phase detector circuit 121. Phase detector 121 includes a first and a second transistor 254, 256, which may be 2N3904 transistors commercially available from Motorola.

Phase reference signals are derived from the service conductors $L_1$, $L_n$ which are input to the receiver R1 via 6.3 volt transformer 260, which has its primary winding 262 connected to conductors $L_1$, $L_n$ and a center tapped secondary winding 264 connected over resistances 266, 268 to the base elements of transistors 254, 256 respectively. The emitter elements of transistors 254, 256 are connected common to the center tap of secondary winding 264 which is connected to ground. It will be apparent therefrom that a positive signal is fed to the base of transistor 254 on one half cycle of the line voltage which appears across service conductors $L_1$, $L_n$ and a positive signal is fed to the base of transistor 256 on the next half cycle, whereby transistors 254, 256 will be enabled on alternate half cycles of the power which occurs on service conductors $L_1$, $L_n$. The collectors of transistors 254, 256 are connected over resistors 270, 272 respectively to the output conductor 269 of operational amplifier circuit 119 and also to a pair of 01, 02 conductors which are output from phase detector 121.

It will be apparent therefore that if a 20 KHz signal is present on input conductor 269 during the period that the transistor 256 is conductive (i.e., during the positive half cycle of the power on service conductors $L_1$, $L_n$ which is assumed to be the 01 signal), the 20 KHz signal on conductor 269 will be fed over 01 conductor. During such period there will of course by no output signal on 02 output conductor. Likewise, during the next half cycle of the power on service conductors $L_1$, $L_n$ transistor 256 conducts, and there will be no output on the 01 or 02 conductors during such period.

Alternatively, assuming that a 02 signal is input over conductor 269, it will be apparent that the 02 output signal is fed over phase conductor 02 only during the half cycle that transistor 256 is conducting, and during the alternate half cycle there will be no signal on either the 01 or 02 conductors.

Thus, by using the power signals on the conductors to which the transponder is connected as a reference at the transmitter end and also as a reference in the receiver phase detector, the phase of the input signal is readily detected and fed over the corresponding output conductors 01, 02 as representations of the logic 1, logic 0 signals which are input at the transponder end.

The signal output on the 01, 02 conductor is fed over rectifiers 280, 290 respectively, to a pair of filters in envelope filter 123. The filters respectively comprise a parallel connected capacitor 284 and resistor 286, and parallel connected capacitor 294 and resistor 296 which have values selected to provide a time constant of approximately one second. Thus, whenever an input is provided to one of the filters, the DC level on the capacitor in such filter is increased correspondingly. Stated briefly, when a 01 signal is detected by phase detector 121, the DC signal level on capacitor 284 increases to a given value, and when a 02 signal is detected by phase detector 121, the DC signal level on capacitor 294 increases to a given value.

As shown, the pulse output of the clock 237 (1 pps) is also fed to a one shot multivibrator 251 which operates a transistor driver 253 for approximately 10 milliseconds to energize relay R17 for a like period. With relay R17 operated, contacts R17 close to equalize the charge on capacitor 284, 294 prior to the input over one of the phase conductors 01, 02, and the increase of the signal on capacitors 284, 294 as the case may be.

The DC output of the 01, 02 filters is fed over resistors 292, 294 respectively to the inputs 4, 5 of differential amplifier 300.

Differential amplifier 300 may comprise an integrated circuit available as SN72741 from Texas Instruments. Terminals 6, 11 of amplifier 300 are connected to −15 volt and +15 volt potential respectively, input terminal 5 is connected over resistor 294 to the output of 02 filter, input terminal 4 is connected over resistor 292 to the output of 01 filter, and output terminal 10 is connected over resistance 304 to the input terminal 4 and over output conductor 236 to A to D converters 310, 314.

Differential amplifier 300 provides an output which is the difference between the inputs which appear at the first and second inputs 4, 5. With detection of a 01 signal, the input from 01 filter to the upper input terminal 4, for example, enables differential amplifier 300 to output a positive signal over output circuit 236, and with detection of a 02 signal, the input from 02 filter to the lower terminal 5, enables differential amplifier 300 to output a negative signal over output circuit 236.

The positive and negative signal output of differential amplifier 125 is fed to the input A to D converter 310 (positive) and the input of A to D converter 314 (negative). A to D converters 310, 314 may comprise circuits available from Texas Instruments as SN72710 circuits, and are connected as shown in FIG. 3, with converter 310 having a +1.5 volt bias and converter 314 having a −1.5 volt bias. With a positive voltage output by differential amplifier 300 over conductor 236 (01 signal) which is greater than +1.5 volts, converter 310 will provide a logic 1 output over conductor 312, and converter 314 will provide a logic 0 output over conductor 316. With a negative voltage output over conductor 236 (02 signal) which is greater than −1.5 volts, the converter 314 will provide a logic 1 output over conductor 316 and conductor 310 will provide a logic 0 output over conductor 312. In the absence of an output from differential amplifier 300, a zero output occurs on conductor 236 and the output of A to D converters 310, 314 are logic 0 signals. The outputs of A to D converters 310, 314 are processed by multiplexers 318, 320, and output as logic 1, logic 0 signals respectively over the appropriate one of the channels CH1–CH16.

More specifically, multiplexers 318, 320 which may be of the type available as SN74154 from Texas Instruments, are enabled by counter 238 in synchronism with tuning multiplexer 115 so that as the receiver circuit 113 in receiver R1 is successively tuned to receive the signal output of each of the successive transmitters T1–T16 of the subgroups associated therewith, the signal output of differential amplifier 300 (as converted to digital outputs by converters 310, 314) is fed over outputs 1–16 of multiplexer 318, 320 and over a corresponding one of the channels CH1–CH16. As will be shown, each channel, such as channel CH1, includes thee conductors, and the output which is provided over the three conductors of each channel, such as CH1, thus corresponds to the signal output by the encoder switch 103 at the corresponding one of the meters, such as M1 (FIG. 1).

G. Data Transmission and Detection

With reference to meter M1 and its associated encoder switch 103 (FIG. 1), it will be recalled that transmitter T1 generates and applies a 01, 80 KHz signal to conductors $L_1$,$L_n$ to continually indicate a first signal (logic 1) is output from encoder switch 103 (movable arm 167 engages contact 161) of a 02, 80 KHz signal is output from encoder switch 103 (movable arm 167 engages contact 163) to indicate a second signal (logic 0) is output from encoder switch 103. As explained above, program timer 116 (FIG. 3) is operative once every sixteen seconds to tune receiver R1 to receive the 80 KHz signals on conductors $L_1$,$L_n$ for a one second interval. During such interval, the beat oscillator 231 in receiver R113 beats a 100 KHz signal against the 80 KHz input signal, and a 20 KHz IF signal is output therefrom which has a phase (01 or 02) which corresponds to the signal output from the meter M1.

The 20 KHz IF signal is amplified by amplifiers 117, 119 and sampled for phase by phase detector 121, and a DC level signal corresponding thereto is applied over envelope filters 123 to differential amplifier 125. If the signal sampled is a 01 signal, a positive potential signal is output by differential amplifier 125 which is fed over A to D positive converter 310 as a high signal to the input for multiplexer 318. If the signal sampled is a 02 signal, a negative potential signal is output by differential amplifier 125 and fed as a high signal over A to D converter 314 to multiplexer 320.

Assuming that a logic 1 signal is output at meter M1 during the one second sampling period at receiver R1, a positive signal output from differential amplifier 125 is fed by multiplexer 318 to its output circuit 1 and one input of gate 322 in Channel 1. The A to D converter 314 however will have no output during such period and no signal is output over the first output circuit 1 of multiplexer 320 to gate 324 for Channel 1. Gate 322 is therefore enabled to provide a high signal output over conductor 325 to represent a logic 1 signal.

If, alternatively, a logic 0 signal is input to the system by meter M1 during the one second interval, a high signal is output by A to D converter 314 to the multiplexer 320 which provides a logic 1 output to gate 324 which operates to provide a high signal output over Channel 1 to indicate a logic 0 signal.

The manner in which multiplexers 318, 320 are stepped to provide logic 1, logic 0 signals over the successive channels CH1–CH16 in synchronism with the tuning of the receivers R1–R16 to the sixteen different frequencies output from transmitters T1–T16 will be apparent from such description.

H. Data Acquisition

At this point the signal outputs of Channels CH1–CH16 over conductors 325, 326 are logic 0, logic 1 signals, and may be used as inputs to various types of data acquisition equipment, one of which is disclosed in detail in the above identified copending application to James N. Bruner.

In such type arrangement, the channels CH1–CH16 (FIG. 4) are connected to discrete twelve-stage pulse counters 345(1) — 345(96), each of which is stepped as a function of the number of reversals of the pulses provided on the three conductor input channels which are associated therewith. The number of reversals in each channel is counted by the counter (such as counter 345(1) for Channel 1 and meter M1) and the signal levels on the output conductors RD0–RD11 for such counter will thus represent, in binary coding, the count which is accumulated on such counter for meter M1. Similar channels CH2–CH96 and counters 345(2) – 345(96) are, of course, provided for the other meters M2–M96.

The counter outputs RD0–RD11 of counter 345(1) are each connected to a corresponding one of the twelve inputs E0–E11, of a multiplexer circuit 346(1) to permit serial readout of the bits on the counter which represent the meter reading stored by the pulse counter 345(1). That is, multiplexer 346(1), which may be of the type commercially available as SN74150 from Texas Instruments, has steering inputs A–D connected to be enabled by steering signals which are provided over inputs A–D in time slots 17–28 of a 29 bit word cycle provided by the data readout circuits 344. The 12 bits stored by counter 345(1) are thus sequentially output over path 354(1) to the first input of a first multiplexer 347(1) to provide sequential binary logic signal levels which represent the accumulated count for meter M1 which are stored in counter 345(1).

Multiplexer 347(1) has sixteen inputs, each of which is connected to the output of a correspondingly different multiplexer 346(1) – 346(16). The inputs of five additional multiplexers 347(2) – 347(6) are connected to the outputs of the multiplexers 347(17) – 347(96), and the A-D steering signals output from data readout circuit 344 are connected to enable multiplexers 346(2) – 346(96) in synchronism with multiplexer 346(1).

The output of the six multiplexers 347(1) – 347(6) is fed to the first six inputs of a meter select multiplexer 349, the output of which is connected over conductor JW to a NAND gate 355 in output circuit 360.

Data readout circuit 344 generates twenty-nine time slots in a cyclic manner to provide signals which effect successive word outputs from the system. A clock 356 drives the readout circuit 344 at a 9280 Hz rate to provide a time slot for each pulse, each twenty-nine time slots thus provided by readout circuit 344 defining a word in the system, the time slot 0 being used for sync programming, time slots 1–16 being used for identification of the selected one of meters M1–M96, and time slots 17–28 being used to transmit the count stored for such meter in the associated one of the counters 345(1) - 345(96).

The data readout circuit 344 provides a signal to enable address select multiplexer 348 over conductor FN during the time slots 1–16, and a signal over path JN to enable multiplexers 347(1) - 347(6) and meter select multiplexer 349 during time slots 17–28. Data readout circuit 344 also cyclically provides sixteen steering signals for the multiplexers 346(1) - 346(96) over output paths A-D during time slots 17–28.

The steering signals A-G which are applied to the steering inputs A-D of the multiplexers 347(1) and 347(6) and E–G of meter select multiplexers are provided by counters 351, 352, the one of the input paths 354(1) - 354(96) which is connected to the output JW of multiplexer 347 being determined by the signal count output from counter 352 to the select inputs A–G. The seven bit signal output of counter 352 on conductor A–G is also connected to the eight marking terminals F8–F16 on multiplexer 348 to identify the particular meter M1–M96 which is being read out at any given time, i.e., when the counter 352 provides a count to terminals A–G of multiplexers 347(1) - 347(6) and multiplexer 349 to enable same to connect the information at one of the inputs 354(1) - 354(16) of one of the multiplexers 347(1) - 347(6) to the output JW of multiplexer 349, the same count on input F8–F16 is used to provide a binary coded bit identification to the system of the particular meter for which such conductor is provided. As indicated, the markings on the first eight terminals F0–F7 are prewired, and are therefore the same for all ninety-six meters M1–M96 in the illustrated group of ninety-six meters.

The counter 351 is used with the system to permit inclusion thereat in the equipment of the copending application. That is, in such system counter 351 (which includes three flip-flops B-D) is advanced at the start of each 29 bit word cycle of data readout circuit 344 and is operative to provide a count of five before reset, with the result that the word output provided by each multiplexer, such as 346(1) for its associated meter, such as M1, as selected by the signals on steering inputs A–G of counter 352 will be read out five times (i.e., data readout circuit 344 generates five discrete word cycles before the count on counter 351 advances one step). At the sixth count, counter 351 advances counter 352 which at its outputs A-G controls multiplexer 347(2) and multiplexer 349 to extend the sixteen bits output from multiplexer 346(2) and counter 345(2) over conductor JW to NAND gate 355 during time slots 17–28 of five successive words as defined by data readout circuit 344. A total readout of the ninety-six meters will therefore require 480 word generation cycles by the data readout circuit 344.

Operation of Readout Circuit

As noted above, data readout circuit 344 is driven by clock 356 to generate words in a cyclic pattern, each of which words has twenty-nine time slots. One time slot (0) is used as a sync signal for each word, sixteen time slots (1–16) are used to identify the meter selected, and twelve slots (17–28) are used to provide the information stored for such meter in its associated counter 345. During the time slots 1–16, data readout circuit 344 provides an enabling signal over conductor FN to enable the meter address multiplexer 348, and during time slots 17-28, data readout circuit 344 provides an enabling signal over path JN to the multiplexers 347(1) - 347(6) and meter select multiplexer 349. During each word generation cycle (in the illustrated embodiment at the end of time slot 16) data readout circuit 344 provides a signal output over conductor T2 to counter 351. After five counts are received over path T2 (i.e., after five words have been generated) the signal output of counter 351 is advanced one count and at such time the count representing signals for the next meter of the group M1–M96 is forwarded to the output circuit 360.

By way of specific example, as the data readout circuit 344 initiates a word generation cycle, an enabling signal is placed on output FN during time slots 1–16 of such word to the enable terminal for address multiplexer 348. As the sixteen steering signals are provided by data readout circuit 344 over outputs A–D to the steering inputs FA–FD on multiplexer 348, the prewired bits which are marked on terminals FO–F9 to identify the group of meters (M1–M96) and the meter identification marking for the selected meter in the group which is placed on terminals F10–F16 by counter 321 are read out serially over output FW to output gate 355. The sixteen bits as serial output over path FW are fed via output gate 355 to drive circuit 360 which provides corresponding bias signals for the varactor diode 335 (i.e., logic 1 or logic 0) in a manner to be described.

As data readout circuit 344 advances to time slot 17 in the word generator, data readout circuit 344 removes the enabling signal from output FN and marks output JN to thereby enable multiplexers 347(1) - 347(6) and meter select multiplexer 349 to select the one of the meters which is indicated by the signals output from counter 352 over steering paths A–D and E–G respectively.

It will be initially assumed that circuit 352 is in the reset condition, and accordingly conductors A–D have signal levels which control each of the multiplexers 347(1) - 347(6) to connect the first input thereto to the inputs 1–6 on meter select multiplexer 349 which is enabled by sterring signals on steering paths E–G to connect its first input path 354(1) from multiplexer 347(1) to output terminal JW and output circuit 360.

It will be recalled that the bit information which indicates the accumulated reading on the counter 345(1) for the first meter M1 is continually applied over path R01–R011 to the twelve inputs of multiplexers 347(1). Such information is in turn continuously fed serially by multiplexer 346(1) to the first input of meter select multiplexer 349 in response to the A–D steering signals which are applied to the A–D steering inputs of multiplexer 346(1) by the data readout circuit 344 during time slots 17–28 of each word. Since the A–D steering signals are applied simultaneously to each of the multiplexers 346(1) - 346(96), the information bits which represent the count for each meter M1–M96 are continuously available at the ninety-six inputs for multiplexers 347(1) – 347(6). However, as indicated above, meter select multiplexer 349 is enabled over inputs E,F,G, to select the output information from only one of the multiplexers 347(1) – 347(6) at a time, and then (by reason of the signal on conductor JN) only during time slots 17–28 of a word.

With completion of the generation cycle for the first word, data readout circuit 344 starts a second word generation cycle and marks output T2 to counter 351 which advances one count to mark the generation of the second word, and therefore the second transmission of information for the selected meter. During the first time slots 1–16 of the second cycle, the meter address for the first meter M1 is once more provided by address select multiplexer 348 and during time slots 17–28 the meter data input from counter 345(1) over path 354*a* to multiplexer 347(1) for the first meter M1 is extended over path 351(1) and multiplexer 349 to the output JW of multiplexer 349 and over gate 355 and output circuit 360 to antenna A.

As the data readout circuit 344 generates five successive words in such manner, the information and address for the first meter M1 is output five times over gate 355 to output circuit 360.

As the last time slot of the word generated in the fifty cycle occurs, the signal on conductor T2 output from the data readout circuit 344 causes the BCD flip-flop in counter 351 to restore to zero.

Counter 352 advances one count and marks inputs A–D for multiplexers 347(1) – 347(6) and inputs E–G for meter select multiplexer 349 with count one whereby the multiplexer 349 is operative during time slots 17–28 of the next five words to connect the output of the second meter reading data multiplexer 346(2) (not shown--but connected via an inverter to input 2) on multiplexer 349 and over output JW to output circuit 360 and antenna A.

With such advance of counter 322, the terminals F10–F16 of the meter address multiplexer 348 will now be marked to indicate that the signals which represent the count for meter M2 is being read out. During the sixth cycle of the data readout circuit 344 therefore, the address of the second meter M2 is transmitted along with the information stored in the second counter 345(2) which is associated with meter M2.

With each advance of counters 352 to a higher count a correspondingly different meter is selected, and the signals representing the count for such meter are output over gate 355 with the code which identifies the particular meter which is being read out.

As counter 352 advances to a count of 96, the address and date for the last meter (meter M96) is read out five times. After the fifth readout of the data for meter M96, counters 321, 322 are reset to initiate a new cycle with the information stored for meter M1 being next selected for readout.

Output Drive Circuit

Gate 355 is also selectively enabled by the data readout circuit 344 during each time slot over conductor 354 to transmit the word data bits output from the meter data storage circuit 341 and the meter address data storage circuit 342 to the output drive circuit 360 which basically includes a transistor 356 having its emitter connected over diode 359 to ground and its collector connected over resistor 357 to positive potential and also over lumped inductance L1′ to the cathode of a varactor diode 335. The anode of the varactor diode 335 is connected through a lumped inductance L2′ to ground.

Varactor diode 335 is connected across the receiving section 331 and the transmitting section 332 of antenna A. When NAND gate 355 is disabled by a logic 1 input thereto, the drive transistor 356 will be turned on to provide a reduced voltage level at its collector and a voltage of approximately −1 volt at the cathode of the varactor diode 335. In this condition (a reverse bias of about one volt), harmonic reply signals will be generated at the 1830 MHz rate to represent a logic 1 data level at the mobile unit.

When the output NAND gate 355 is enabled by a logic 0, the resultant logic 0 Signal at its output turns transistor 356 off, and as the potential at the transistor collector increases, the potential at the cathode of the varactor diode 335 likewise increases (approximately 12 volts in one embodiment) to provide a reverse bias for the varactor diode 335. As the varactor diode 335 is reverse biassed at such level, the generation of harmonic reply signals at the 1830 MHz rate will be inhibited, and the absence of harmonic signals for radiation to the mobile unit will represent logic 0 data levels.

Such transmitting mode is described in more detail in the above identified copending application. Briefly stated, as the mobile unit moves into the bearing and range of the output circuit 360 for the meters M1–M96, the 915 Hz interrogate signals transmitted by the mobile unit (not shown) are received by the receive section 321 of the transmitter antenna A (which is tuned to the frequency of the interrogate signals), and impressed across the associated diode 335 to effect nonlinear changes in the impedance of such diode. The distortion of the received signals as applied to the diode effects the consequent generation of harmonics of the received interrogate signals which are in turn used to transmit information back to the mobile unit.

Since the transmit section 332 of the antenna A is tuned to the frequency of the generated harmonic of the interrogate signals, the antenna A will be operative to radiate the resultant harmonics back to the mobile unit. As the harmonic signals thus generated are retransmitted to the mobile unit, the transistor 356 controls modulation of the retransmitted signals with the meter data (i.e., in the present example the reading on a selected meter register and the identity number for such meter) as disclosed above.

That is, the two level data is applied by transistor 356 to diode 335 as first and second bias conditions respectively for the nonlinear diode. With bias levels of alternate levels applied to the nonlinear diode, the signal level of the harmonics generated will correspondingly be of different magnitudes (first and second) so that the harmonic signals radiated to the mobile unit will, as modulated, provide meter information to the equipment at the mobile unit as amplitude variations of the harmonic signals. The harmonic signals received at the mobile unit are translated into data bits of a first and second value (1 and 0) and as grouped provide a word which represents the meter reading and meter identification for such meter.

MODIFICATION

While the foregoing system has been disclosed in a pattern wherein 96 transmitters are divided into a first and second group of 48 transmitters, and each group of 48 transmitters are divided into subgroups of 16 transmitters for connection to the three conductor power lines along with two groups of three receivers each, each receive groups being divided into subgroups of one receiver each, it will be apparent that without departing from the invention, the size of the groups and subgroups may be altered to accommodate different field conditions and different circuitry arrangements. In a new community, for example, one receiver may be initially installed to work with one group of transmitters and as the community grows (and the need for additional service develops), further receivers and transmitters may be added in the manner of the novel pattern. There is, of course, no specific requirement that the transmitter subgroups be limited to sixteen transmitters, or that each receiver be limited to the receipt of the output of sixteen transmitters, such arrangement having been selected as one illustrative embodiment.

It is also noted that the novel transmitters and receivers also have utility with a power system which has two wire service to the consumer. In a typical system of such type thirty-two transmitters may be divided into two subgroups of sixteen transmitters each, each of which subgroups is assigned to operate in a different frequency band. The receivers would comprise two receivers, the first receiver being tuned to receive the output frequencies of the band assigned to the first sixteen transmitters, and the second receiver being tuned to receive the output frequencies of the band assigned to the second sixteen transmitters.

It is also noted that while a separate timer unit 116 and multiplexer 115 have been shown for each receiver, such as R1, in practice the timer and multiplexer equipment will undoubtedly be used to provide tuning enablement of all or a large number of the associated receivers.

The band of frequencies, and the specific frequencies in the bands which are used in the present embodiment may also be of different values, it being important however that the frequency selected be of values to minimize the generation of harmonics which might interfere with one another.

The superheterodyne receiver 113, as shown, utilizes a beat oscillator to provide a 20 KHz IF frequency, and the tuning circuitry is adjusted to provide sixteeen different beat frequencies as the receiver is tuned to the sixteen different frequencies in its assigned band. In certain systems, receiver 113 may be initially tuned to a lower output frequency, such as 1½ KHz, whereby a portion of the circuitry used to adjust the beat frequency to the 16 different values may be eliminated.

Figure 4:
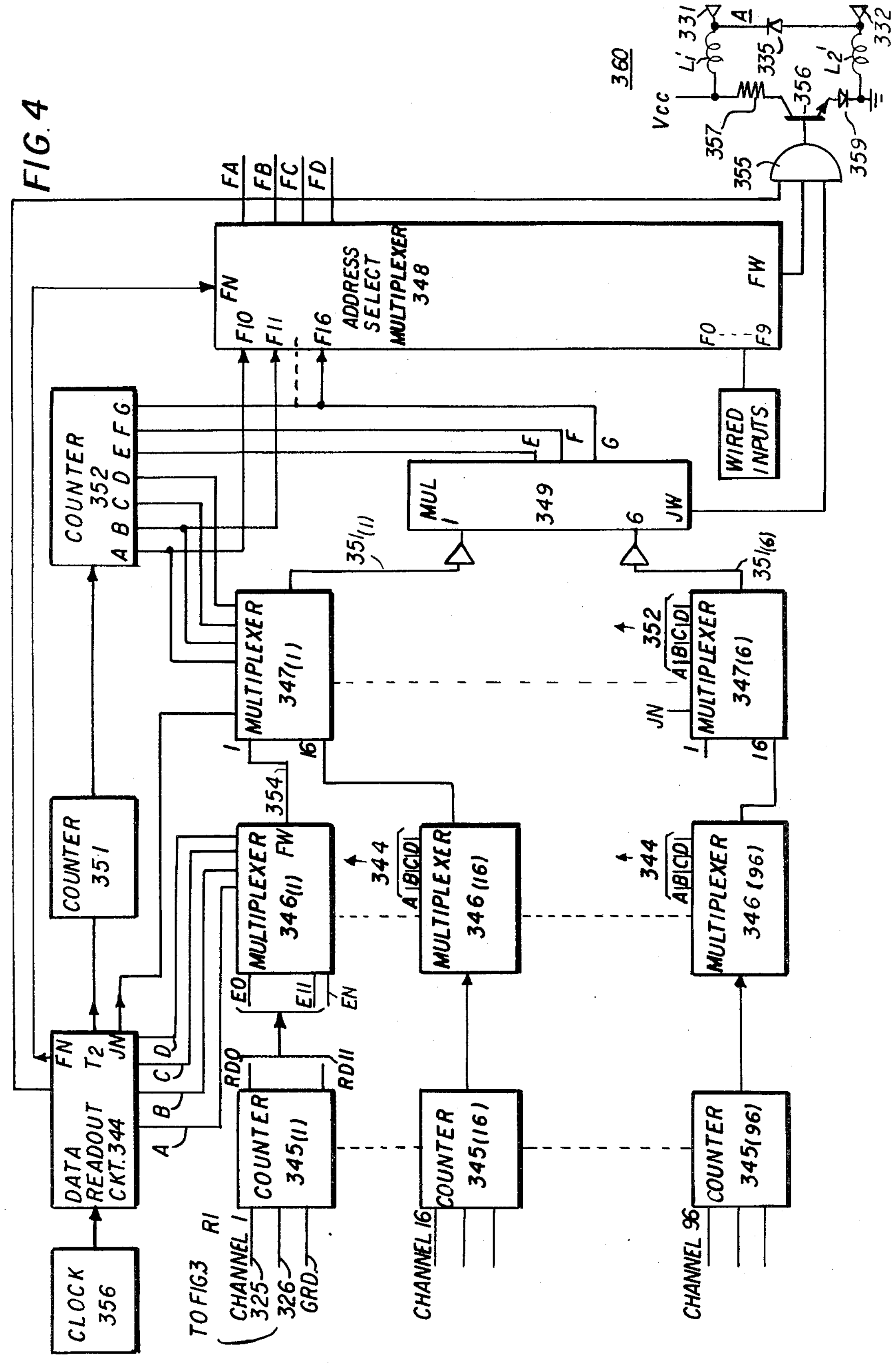
FIG. 4 is a schematic representation of a readout circuit which may be utilized with the system of FIG. 1.

While one embodiment of the accumulator and readout circuit is shown in FIG. 4, it will also be apparent that the novel system concepts of FIG. 1, and the novel transmitter and receiver equipment of FIGS. 2 and 3 may be readily used with other known accumulator and signal processing equipment without departing from the spirit of the invention.

It will be apparent from the several foregoing examples that these and other changes and modifications may be made in the illustrated system without departing either in spirit or scope from the invention set forth hereinabove.

What is claimed is:

1. An automatic system for reading measurements for meter devices over a plurality of transmission lines of an electric power distribution system comprising: groups of meter transmitter circuits, each group having a different assigned frequency band, and each meter transmitter circuit having means generating signals at a different frequency within the frequency band assigned to its group for representing the measurements of one associated meter device, means connecting the signals of the signal generator means of each group only to a different pair of the transmission lines for providing subgroups of the signal generator means, groups of receivers, means in each receiver tuning each receiver in each group for receiving the signals in a different one of the assigned frequency bands, and means connecting a receiver in each group to the different pairs of the transmission lines as subgroups of the receivers in each receiver group for receiving only the signals of a subgroup of transmitters connected to the same transmission line pair.

2. A system as set forth in claim 1 in which said signal generator means in each of said meter transmitter circuits includes means connecting said signal generating means to the same transmission line pair to which said generated signal of said signal generator means is connected for providing power to said signal generator means.

3. A system as set forth in claim 1 in which said signal generator means in a first group includes means for providing frequency output signals in a first band, and said signal generator means in a second group includes means for providing frequency output signals in a second band, and in which each group of signal generator means is divided into three subgroups, one of said subgroups including means connecting the signal generator means of said one subgroup to a first and second one of said transmission lines, a second subgroup including means for connecting the signal generator means of the second subgroup to a first and third ones of said transmission lines, and a third subgroup including means for connecting the signal generator means of the third subgroup to the second and third ones of said transmission lines.

4. A system as set forth in claim 1 in which each receiver of a group additionally comprises means tuning said receiver for sequentially receiving said different frequency signals in one of said frequency bands.

5. A system as set forth in claim 1 in which said transmission lines comprise three conductors $L_1$, $L_n$, and $L_2$; and in which one group of receivers includes means tuned to receive signals in one frequency band, and a second group of receivers includes means tuned to receive signals in a second frequency band, and in which said means connecting said receivers to said transmission line include means connecting subgroups of one receiver in each group to the conductor pair $L_1$, $L_n$, means connecting second subgroups of one receiver in each group to the conductor pair $L_1$, $L_2$, and means connecting third subgroups of one receiver in each group to the conductor pair $L_2$, $L_n$.

6. A system as set forth in claim 5 which includes program means sequentially tuning the receiver in each subgroup to each of the signal frequencies generated by the signal generating means connected to the same transmission line pair as the receiver for receiving the signals of each signal generator means in one subgroup of transmitter circuits.

7. A system as set forth in claim 6 in which said receiver tuning means comprise superheterodyne receiver tuning means haivng oscillator means for providing a beat IF signal output, and means adjusting said oscillator means for providing the same frequency IF signal for each of the different frequency signals to which said receiver is tuned.

8. A system as set forth in claim 6 wherein said signal generating means additionally comprise means phase encoding said generated signals for representing said meter measurements and in which each said receiver includes means for detecting said phase of said signals received thereby, means for providing signals over discrete output paths for each different phase signal detected, and means connected to said paths and responsive to said sequential receiver tuning means for providing a separate count of the signals output over each of said paths for each of said transmitter circuits to which said receiver is tuned.

9. A system as set forth in claim 1 in which each of said signal generating means additionally comprise means phase encoding said generated signals for representing said meter measurements and said receivers include means tuning said receivers to receive each of said different frequencies in said bands transmitted by one said subgroup of transmitter circuits, means for detecting said phase of said transmitted signals and for providing output signals indicative said detected phase, means for separately storing said output signals, means for selectively extending said output signals to said separate storage means, and means for selectively enabling said tuning means to receive said signal generator means signals of different ones of said transmitter circuits and simultaneously controlling said selectively extending means to extend said signal output of said phase detector means to a one of said storage means assigned to said transmitter circuit from which said receiver received said signal generator means signals.

10. A system as set forth in claim 1 which includes means connected to said receiver for accumulating the measurements represented by said signals received by said receiver, and a signal processing means for providing data words which represent the accumulated measurements of each meter and the identity of each meter.

11. A system as set forth in claim 1 in which said signal generator means includes an encoder switch and means operatively connecting said switch and said associated meter device for operating said switch in correspondence to measurements of said associated meter device and in which said signal generator means further includes an oscillator circuit for generating said signal generator signals and an enabling circuit responsive to said switch for enabling oscillator generation of said signals of a first phase to represent one set of measurements of said associated meter device and of a second phase to represent a second set of measurements of said associated meter device, and in which said means for connecting the signal output of each signal generator means to its assigned pair of said transmission lines includes a series resonant circuit.

* * * * *

PO-1050
(5/69)

UNITED STATES PATENT OFFICE
CERTIFICATE OF CORRECTION

Patent No. 3,815,119 Dated June 4, 1974

Inventor(s) Alexander Finlay, Jr., Robert E. Dyer and William D. Kessler

It is certified that error appears in the above-identified patent and that said Letters Patent are hereby corrected as shown below:

Column 24, line 2, change "for" to -- of --.

Signed and Sealed this

Twenty-seventh Day of July 1976

[SEAL]

Attest:

RUTH C. MASON
*Attesting Officer*

C. MARSHALL DANN
*Commissioner of Patents and Trademarks*